(12) United States Patent
Shin

(10) Patent No.: US 6,804,724 B2
(45) Date of Patent: *Oct. 12, 2004

(54) ANALOG/DIGITAL DISPLAY ADAPTER AND A COMPUTER SYSTEM HAVING THE SAME

(75) Inventor: Seung-Gi Shin, Suwon (KR)

(73) Assignee: Samsung Electronics Co., Ltd., Suwon-si (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/301,609

(22) Filed: Apr. 29, 1999

(65) Prior Publication Data

US 2002/0149541 A1 Oct. 17, 2002

(30) Foreign Application Priority Data

Apr. 29, 1998 (KR) .............................................. 98-15395
Oct. 16, 1998 (KR) .............................................. 98-43766

(51) Int. Cl.[7] .............................................. G06F 13/00
(52) U.S. Cl. .............................. 710/2; 345/3; 345/147
(58) Field of Search .............................. 345/147, 3, 22, 345/186, 89, 1, 553, 132, 127, 30, 211–213; 710/2

(56) References Cited

U.S. PATENT DOCUMENTS

| | | | |
|---|---|---|---|
| 5,150,109 A | | 9/1992 | Berry .......................... 345/600 |
| 5,491,496 A | * | 2/1996 | Tomiyasu .................... 345/147 |
| 5,559,525 A | * | 9/1996 | Zenda ............................ 345/1 |
| 5,608,418 A | | 3/1997 | McNally ..................... 568/853 |
| 5,710,570 A | * | 1/1998 | Wada et al. .................... 345/3 |
| 5,757,338 A | | 5/1998 | Bassetti et al. .............. 345/3.2 |
| 6,028,585 A | * | 2/2000 | Ishii et al. ................... 345/132 |
| 6,262,695 B1 | * | 7/2001 | McGowan ....................... 345/1 |

FOREIGN PATENT DOCUMENTS

| | | |
|---|---|---|
| EP | 0 419 910 A2 | 4/1991 |
| EP | 0 802 519 A1 | 10/1997 |

OTHER PUBLICATIONS

The User Manual for the Gateway Solo 5300 notebook computer, pp. 5 and 20.
Printout of www.ati.com/products/mobilityradeon/display.html from ATI technologoes, Inc.

(List continued on next page.)

*Primary Examiner*—Jeffrey Gaffin
*Assistant Examiner*—Harold Kim
(74) *Attorney, Agent, or Firm*—Robert E. Bushnell, Esq.

(57) ABSTRACT

A desktop computer system has a display adapter capable of supporting a digital display such as LCD panels as well as an analog display. The computer system provides analog/digital video signals outputted from the display adapter with a CRT monitor or a LCD monitor depending upon the monitor cable connection state. The computer system further has a power saving function to be performed in the display adapter also depending upon the monitor cable connection state. The display adapter includes two video ports, that is, a first video port being coupled with the CRT monitor cable, and a second video port being coupled with the digital monitor cable. Further included is a digital transmitter for sending parallel digital video signals to the LCD monitor through the second video port. A monitor cable sensing circuit is provided to detect connection state of the digital monitor cable. To this end, the digital monitor generates a signal being sent to the second video port over the monitor cable, thereby informing the video controller of the monitor cable connection state. If the LCD monitor cable is not connected with the video port, the sensing circuit prevents the display enable (DE) signal supplied by the video controller from being inputted to the transmitter.

14 Claims, 19 Drawing Sheets

OTHER PUBLICATIONS

Printout of www.ati.com/support/infobase/3588.html from ATI Technologies, Inc.

Printout of techrepublic.com.com/5100–6270_11–5053877.html.

Printout of www.realtimesoft.com/multimon/guide/laptops.asp.

Printout of www.rdpslides.com/pptfaq/FAQ00476.htm.

Developer's note to the Power Macintosh G3 All–in–one computer, pp. 18 and 26.

www.whatis.com or www.whatis.techtarget.com definition for "monitor" and "display".

XP–002123075, VESA (Video Electronics Standards Association), *Plug and Display (P & D™) Standard, Version 1*, dated Jun. 11, 1997.

* cited by examiner

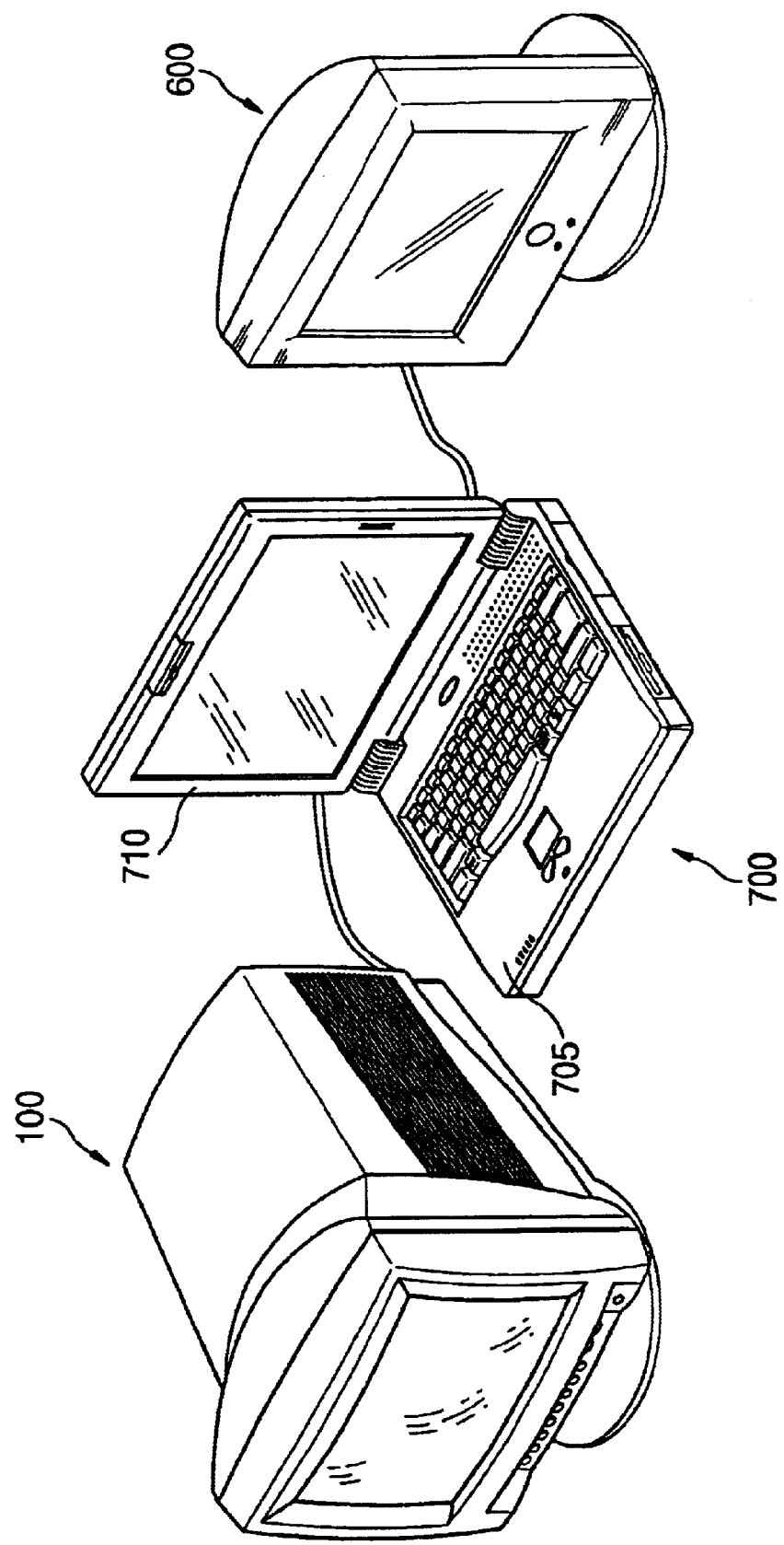

ANALOG/DIGITAL DISPLAY ADAPTER AND A COMPUTER SYSTEM HAVING THE SAME

CLAIM OF PRIORITY

This application makes reference to, incorporates the same herein, and claims all benefits accruing under 35 U.S.C. § 119 from an application for Analog/Digital Display Adapter and a Computer System Having the Same earlier filed in the Korean Industrial Property Office on Apr. 29 1998 and there duly assigned Serial No. 15395/1998 and on Oct. 16 1998 and there duly assigned Serial No. 43766/1998.

1. Field of the Invention

The present invention relates to computer systems, and more particularly to a computer system having dual and triple display function that supports analog displays and digital displays.

2. Discussion of the Related Art

Conventionally, personal computers are equipped with cathode ray tube (CRT) monitors. Also, portable computers such as laptop and notebook computers chiefly use flat panel liquid crystal displays. Occasionally, a desktop computer is equipped with the liquid crystal display (LCD) monitor, although it is costly. Today, liquid crystal displays are considered as a substitute for the CRT display for their compactness and low power consumption.

In the meantime, display monitors adopting the LCD panel have been developed to be used with the desktop personal computer. The LCD monitor has advantages of low power consumption and low electromagnetic wave radiation. LCD monitors commonly include an interface circuitry that converts analog video signals inputted from the system host into digital video signals in order to drive every pixel of the LCD panel. In particular, advanced digital display systems use all-digital flat panel display interface that eliminates the analog-to-digital conversion of the video signals and transmits digital video data from a host video controller to the LCD monitor through high speed data channel. This solves the digital interface design problems such as increasing clock rates, data lines, and cable length. In this system, the video controller circuitry converts the video memory data into transferable form and reconstructs it once it gets to the display panel.

Yet there has not been provided in the desktop computer a display adapter or video card that supports that all-digital interface LCD monitor. Further, in the notebook computer, there has not been provided an external digital video output function that allows use of the all-digital interface LCD monitor.

Furthermore, there are cases where either the external monitor cable fails to connect with the external video port of the notebook computer or the external monitor is not supplied with the power. In either case, when the notebook computer system is set to output video signals through the external video port, the external monitor will not operate and thus nothing appeared on the monitor screen.

Japanese Patent 2-64693 discloses a computer in which a CRT and an LCD are both available from separate output ports on a computer. U.S. Pat. No. 5,608,418 for a Flat Panel Display Interface For a High Resolution Computer Graphics System to McNally discloses a graphics subsystem that contains a flat panel connector and a CRT connector. In addition, McNally shows that a color buffer circuit receives a flat panel sense data which indicates whether the flat panel display is coupled to the flat panel interface lines.

What is needed is a portable, notebook computer having an LCD display panel, that can accommodate hookups to another LCD digital flat panel display and a hookup to a CRT monitor. In this arrangement, the extra LCD display will contain circuitry that will let the notebook computer know whether the extra LCD display monitor is hooked up so that power will be delivered to the LCD hookup only when an LCD monitor is plugged into the LCD hookup.

SUMMARY OF THE INVENTION

The present invention is intended to solve the prior art problems, and it is therefore an object of the invention to provide a display adapter capable of supporting digital displays as well as analog displays.

It is another object of the invention to provide a computer display system having dual display adapters capable of connecting one of the displays depending upon the monitor cable connection state.

It is further object of the invention to provide a computer display system having dual display adapters capable of reducing power consumed in one display adapter depending upon the monitor cable connection state.

It is further yet another object to provide a triple display notebook computer where the notebook computer will support hookups with another LCD display and a CRT display.

It is still another object to provide a monitor for the LCD hookup lines so that power will only be delivered to the LCD hookup only if the extra LCD monitor is plugged into the LCD hookup.

In accordance with one aspect of the present invention, a desktop computer system is provided, which comprises: a main board having at least one expansion slot; and a display adapter installed in one of the expansion slot of the main board, in which the display adapter including: a video controller for providing analog video signals and digital video data with the CRT display and digital displays, respectively; a first video port for connecting with the CRT monitor cable; and a second video port for connecting with the digital display monitor.

In accordance with another aspect of the present invention, a display adapter for use in a computer system is provided, which comprises: a video controller for outputting serial analog video signals and parallel digital video signals; a first connector being coupled with the CRT monitor cable connector; a second connector being coupled with the digital monitor cable connector; and a digital transmitter for sending parallel digital video signals to a digital display through the second connector.

The display adapter further comprises a monitor cable sensing means for detecting connection of the digital monitor cable connector with the second connector, whereby a display enable signal is generated in the video controller and being sent to the digital transmitter when the connection between the digital monitor cable and the second connector has been completed.

Preferably, the digital monitor includes means for generating a signal to be sent to the second connector of the display adapter over the monitor cable, thereby informing the monitor cable connection with the second connector to the video controller.

Further, the display adapter further comprises a power supply control circuit for switching on/off of the supply voltages directed to the digital transmitter, in which the power supply control circuit responds to the signal fed from the digital monitor such that the supply voltages are supplied with the transmitter when the connection between the digital monitor cable and the second connector has been completed.

In accordance with the other aspect of the present invention, a portable computer system is provided, which comprises: a LCD panel hingedly attached to the main body of the portable computer; a main board having a display adapter; a video controller capable of providing digital video data with the LCD panel; a transmitter for sending parallel digital video data to an extra digital monitor; and an external video port for connecting a cable of the external digital monitor.

The display adapter according to this invention allows the video signal to be sent to one of the LCD monitor and CRT monitor, any one that is connected with the video card, regardless of the video start-up direction or video output path set in the computer system. Further, the display adapter of the invention is capable of reducing power consumed in the digital transmitter when the monitor cable is disconnected from the computer system.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 18 is an exterior view of a notebook computer having analog/digital video adapter, showing connection of external CRT monitor and LCD monitor therewith;

DETAILED DESCRIPTION OF THE INVENTION

Figure 1:
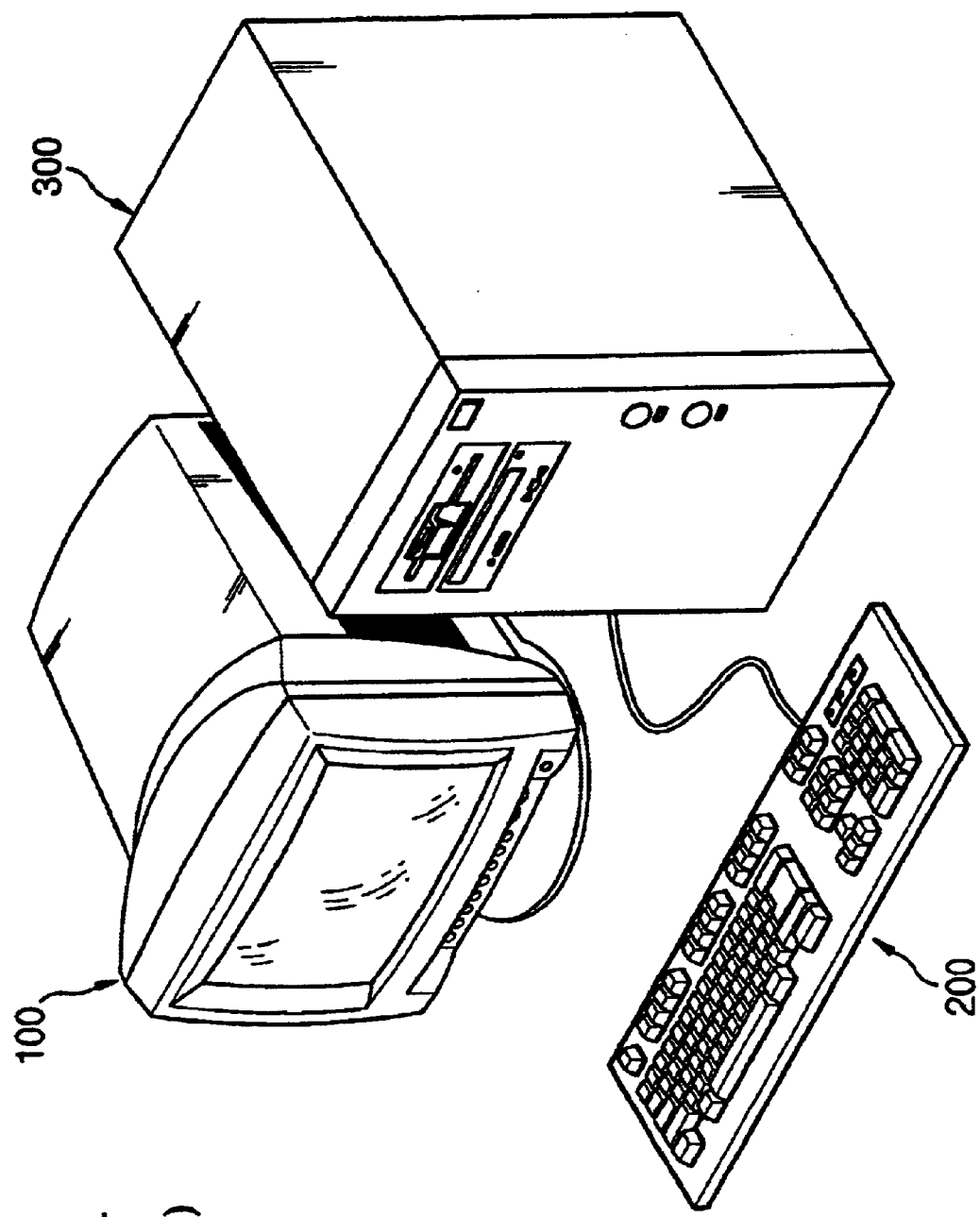
FIG. 1 is an exterior view of an earlier desk top personal computer with a CRT monitor.
Figure 2:
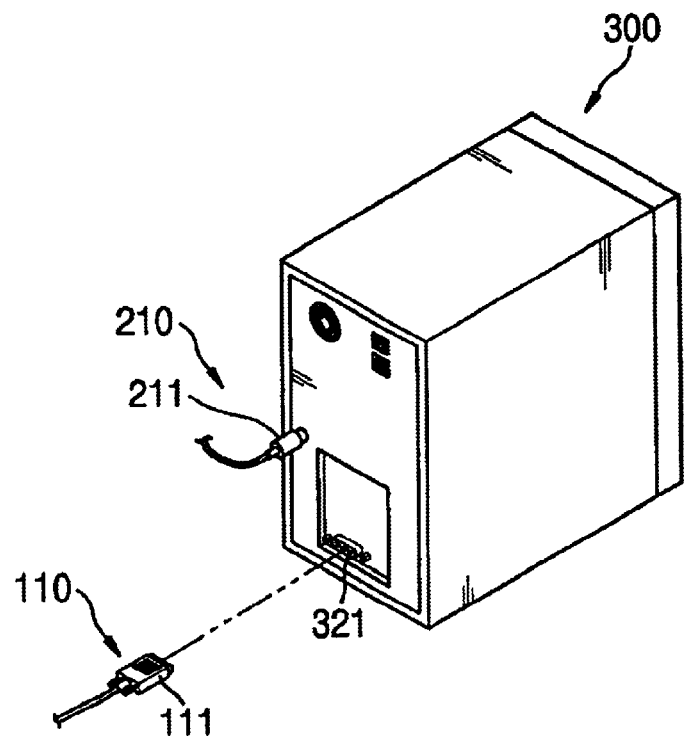
FIG. 2 is a rear view of the desk top computer of FIG. 1, for showing connection of the CRT monitor cable with a video port thereof.
Figure 3:
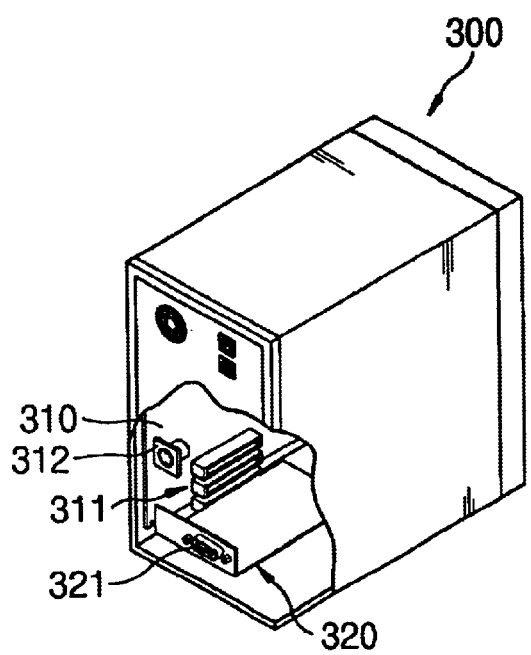
FIG. 3 is a view similar to FIG. 2, showing a video card installed in an expansion slot of the computer.

An earlier desk top personal computer is shown in FIG. 1, in which a CRT monitor 100 and keyboard 200 are coupled to a tower type personal computer 300 as indispensable input/output devices. The CRT monitor 100 and keyboard 200 are connected to the computer 300 via signal cables 110 and 210 as shown in FIG. 2. These signal cables 110 and 210 are provided with at one end connectors 111 and 211 so they can be coupled with the counterpart connectors or ports 321 and 312 provided in the computer. As shown in FIG. 3, the video port 321 is mounted in a video adapter card 320 installed in one of expansion slots 311 of the system mother board 310. The keyboard port 312 is also mounted in the mother board 310.

Figure 4:
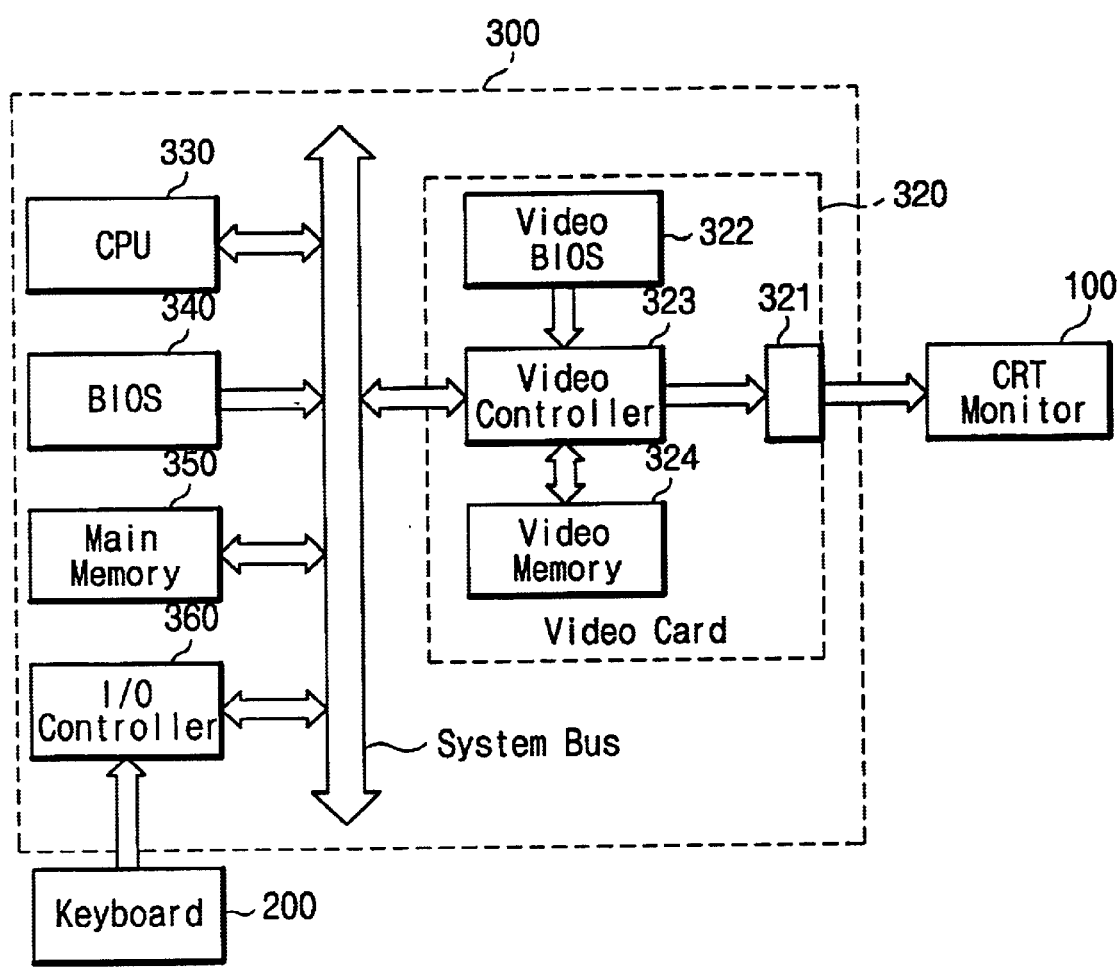
FIG. 4 is a block diagram of an earlier computer system having a VGA card.

A configuration of the earlier computer system having such a connection can be seen in FIG. 4. The computer system comprises a central processing unit (CPU) 330, a BIOS 340, a main memory 350, an I/O controller 360, and a video card 320. The video card 320 includes a video BIOS 322, a video controller 323, a video memory 324, and a connector 321. The video controller 323 generates analog R, G, B video signals corresponding to the stored image in the video memory 324 and transmits the serialized video signals along with horizontal and vertical synchronizing signals to the CRT monitor 100 through the connector 321. The connector 321 commonly uses 15-pin D-Sub female VGA connectors. Thus, most desktop computers have been designed to use with the CRT monitor.

Figure 5:
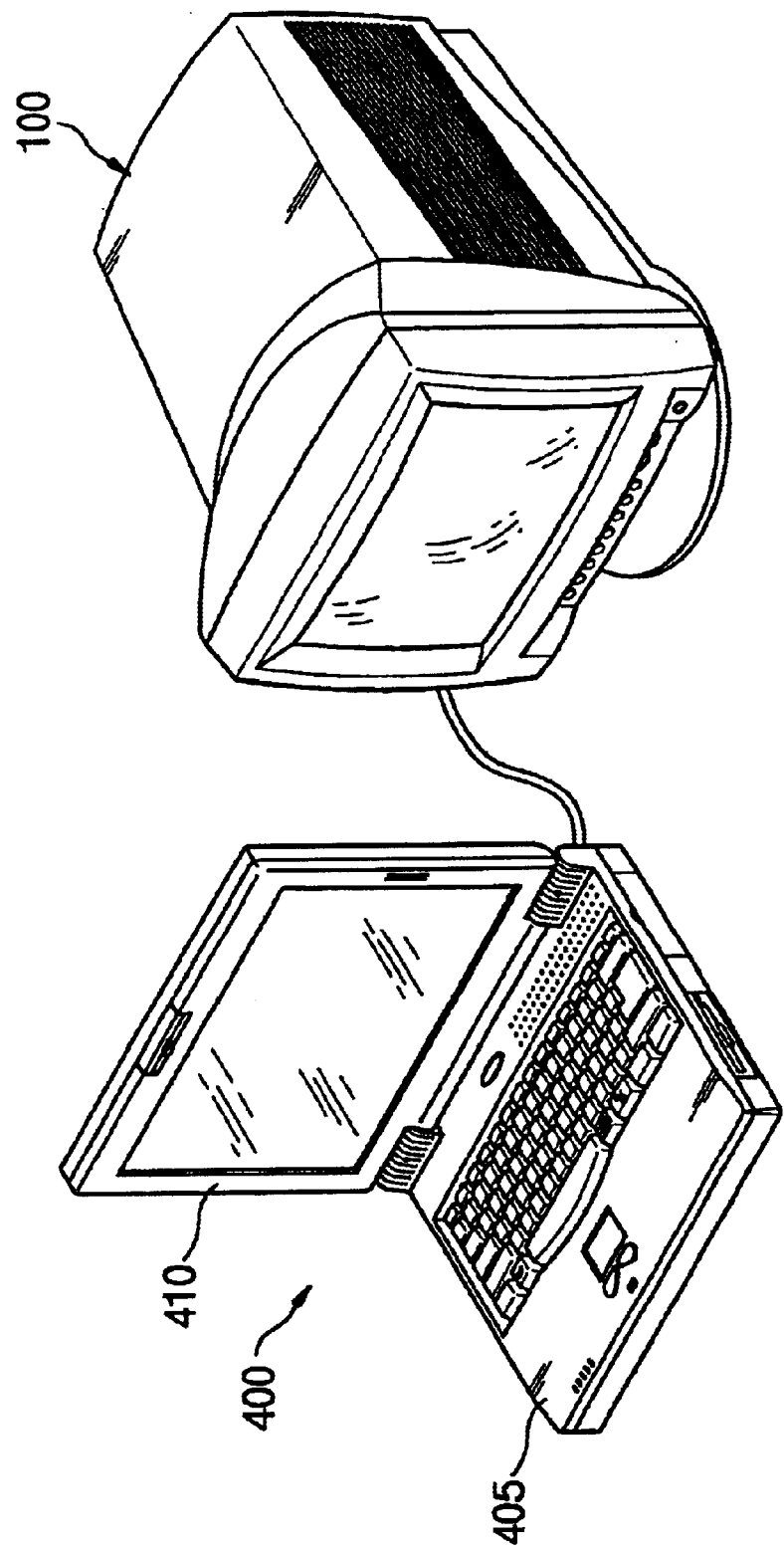
FIG. 5 is an exterior view of an earlier notebook computer, for showing connection of an extra CRT monitor therewith.
Figure 6:
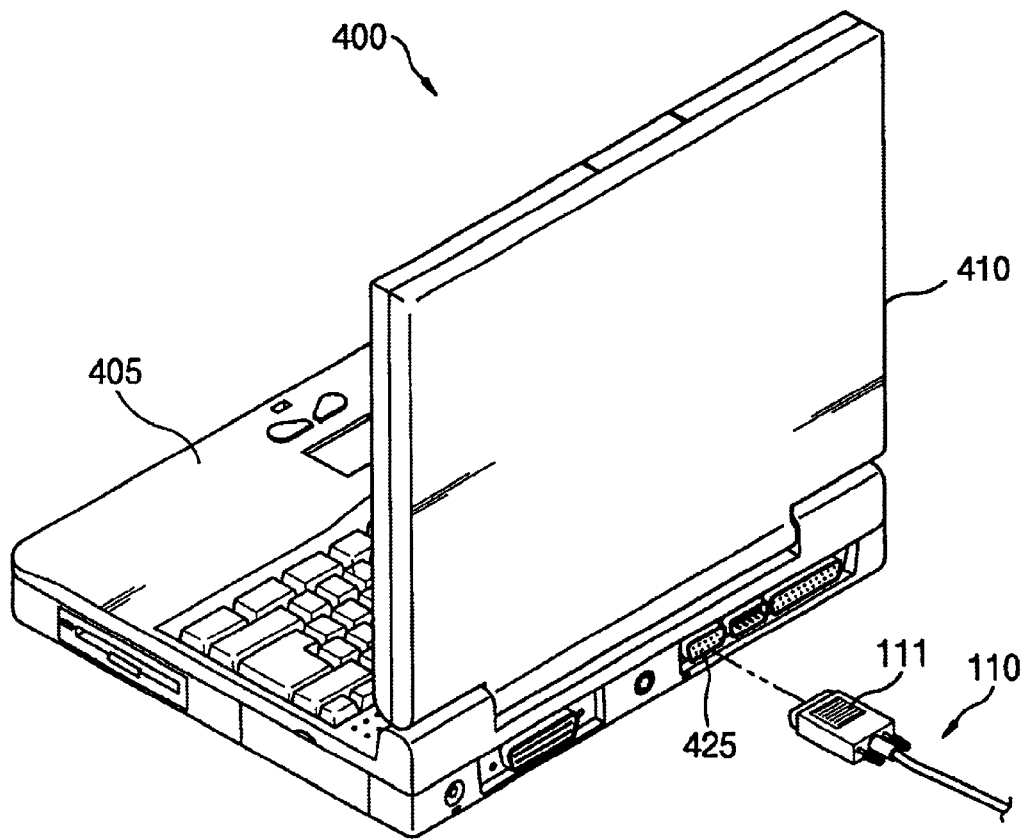
FIG. 6 is a rear view of the notebook computer of FIG. 5, for showing connection of the CRT monitor cable with an external video port thereof.

In the case of a portable computer, usually a LCD panel is used as a main display and selectively an extra CRT monitor can be used therewith as shown in FIG. 5. The LCD panel 410 is hingedly attached to the main body 405 of notebook computer 400, facing a computer user in the open position and forming a lid covering the top portion of the main body 405 in the close position. The CRT monitor 100 can be selectively connected with the notebook computer, if an external video port is provided in the notebook computer. FIG. 6 shows the rear side of the notebook computer 400, where an external video port 425, preferably 15-pin D-Sub female connector is provided in line with serial/parallel ports. The CRT monitor cable 110 has analog 15-pin D-Sub male connector 111 to be coupled with the external video port 425 when required.

Figure 7:
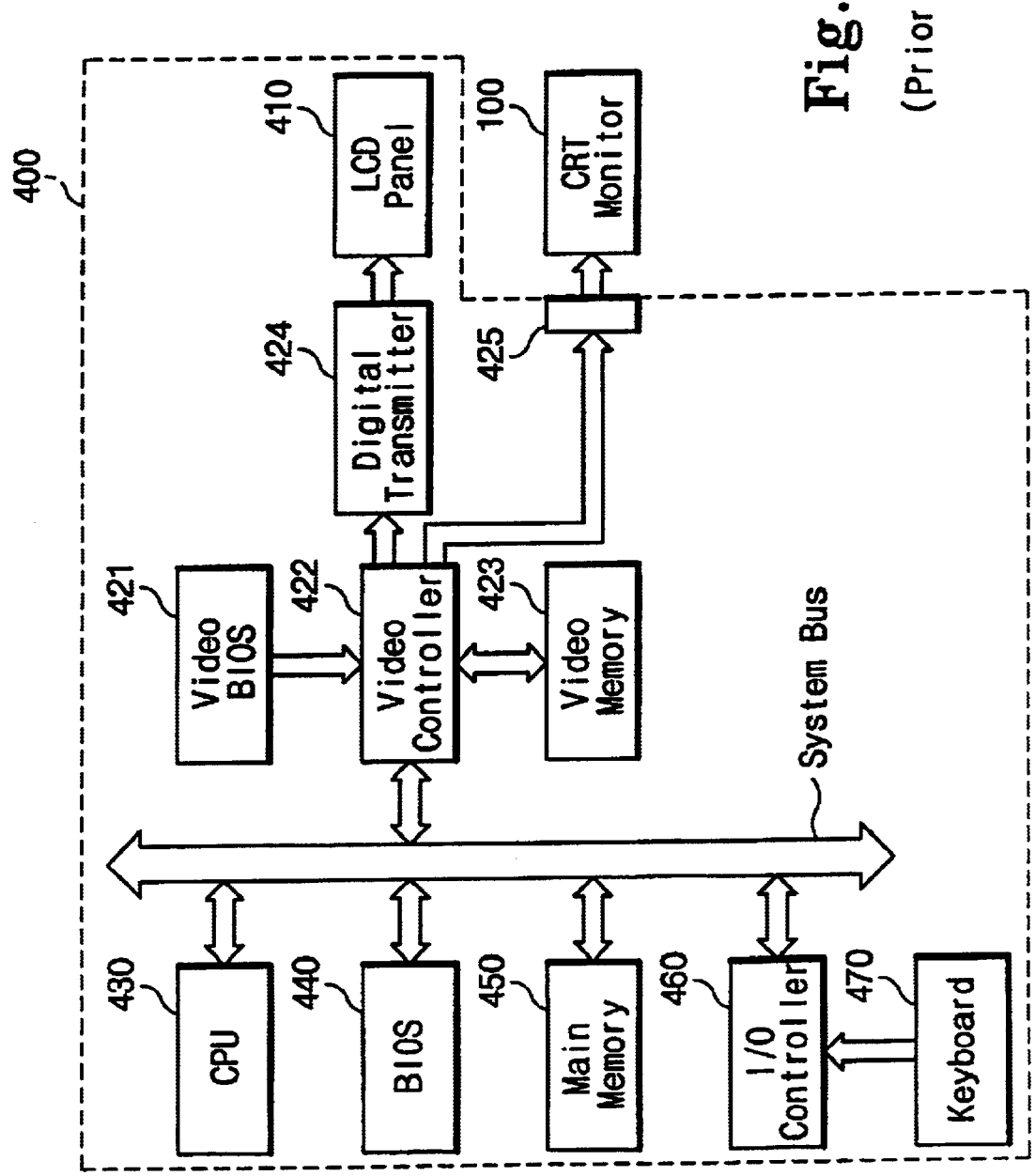
FIG. 7 is a block diagram of an earlier notebook computer system having a VGA card with a LCD panel interface and the external CRT port.

FIG. 7 shows a configuration of an earlier notebook computer system as described above. The notebook computer system comprises a central processing unit (CPU) 430, a BIOS 440, a main memory 450, an I/O controller 460, a video BIOS 421, a video controller 422, a video memory 423, and a digital transmitter/receiver 424. The digital transmitter/receiver 424 is a high speed digital video interconnect device for sending video memory data to the LCD panel 410 under control of the video controller 422. The video controller 422 also generates analog R, G, B video signals corresponding to the stored image in the video memory 423 and transmits serialized video signals along with horizontal and vertical synchronizing signals to the CRT monitor 100 through the VGA connector 425. The system has a video output path control function that can selectively operate the LCD panel 410 and CRT monitor 100 in response to a special key combination input of the keyboard 470. Both LCD panel 410 and CRT monitor 100 can be operated simultaneously in a dual display mode by the key manipulation.

Figure 8:
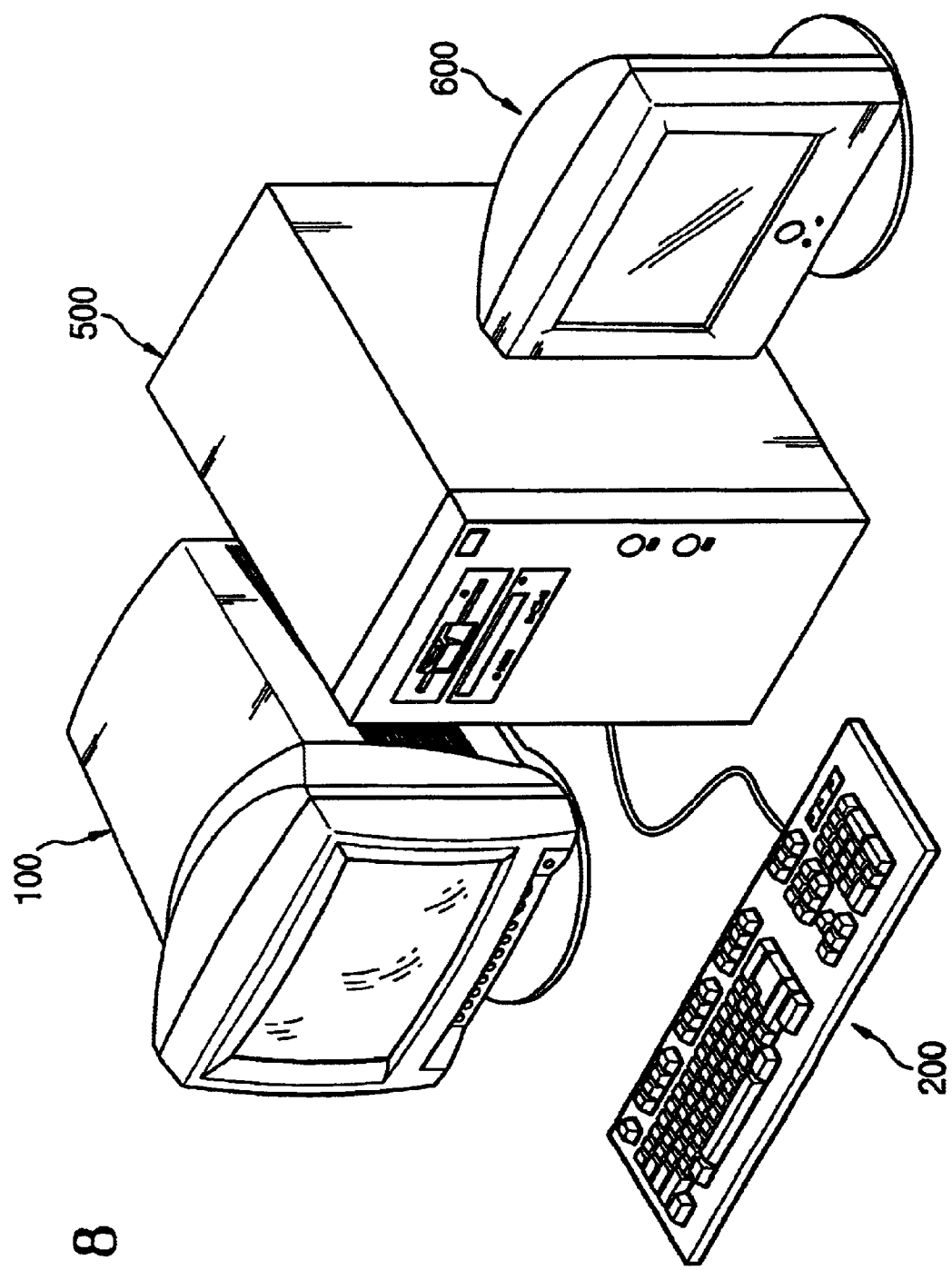
FIG. 8 is an exterior view of a desktop computer having an analog/digital video adapter, showing connection of CRT monitor and LCD monitor therewith.

Referring to FIG. 8, there is shown a desktop computer 500 in which a CRT monitor 100 and a LCD monitor 600 are connected therewith. The LCD monitor 600 is a digital display that digitally interfaces with the computer 500. Also, the computer 500 has a display adapter having dual display function for the VGA analog video type display and the digital display in accordance with one embodiment of this invention. Reference number 200 denotes a keyboard for use with the computer 500.

Figure 9:
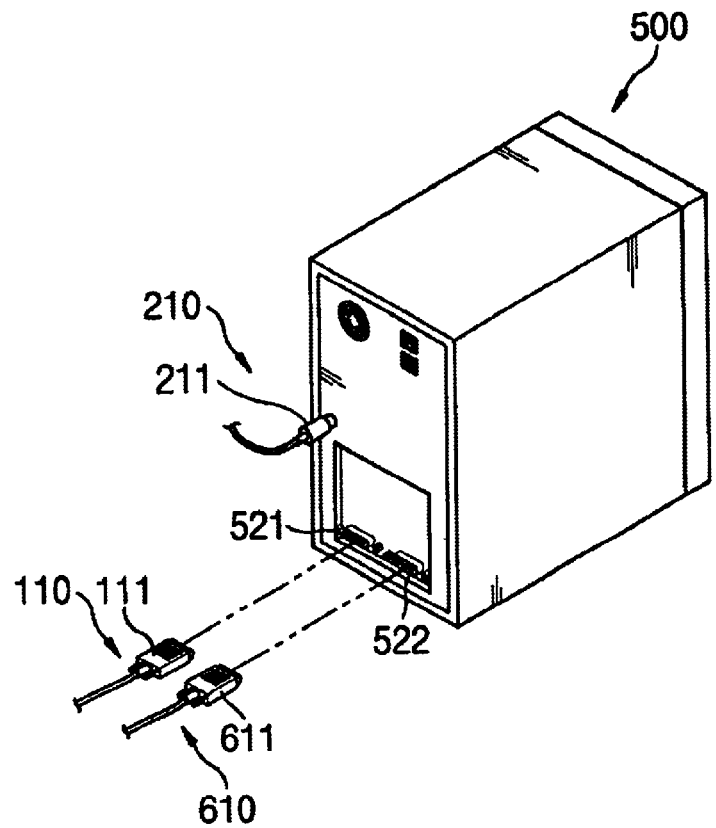
FIG. 9 is a rear view of the desktop computer of FIG. 8, for showing connection of the CRT monitor cable and LCD monitor cable with two video ports thereof.
Figure 10:
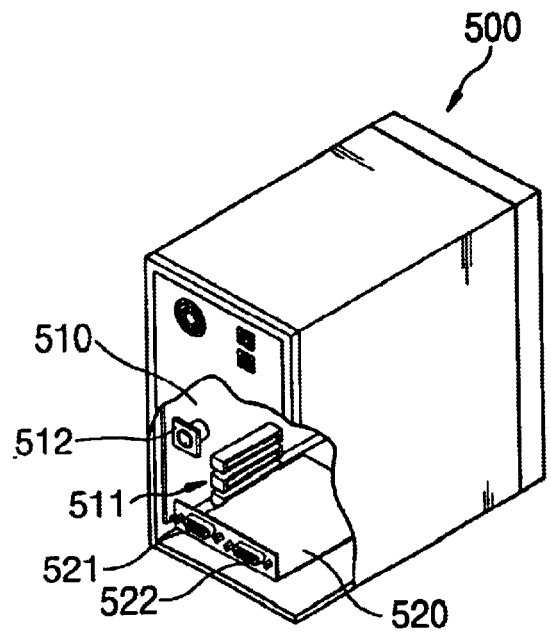
FIG. 10 is a view similar to FIG. 9, showing a VGA card having two video ports installed in an expansion slot of the computer.

The CRT monitor 100 and LCD monitor 600 are connected to the computer 500 via signal cables 110 and 610 as shown in FIG. 9. These signal cables 110 and 610 are provided with at one end connectors 111 and 611 so that they can be coupled with the counterpart connectors or ports 521 and 522 provided in the computer. Also, connected is the keyboard signal cable 210 via a connector 211. As shown in FIG. 10, two video ports 521 and 522 are mounted in a display adapter or video card 520 installed in one of expansion slots 511 of the system mother board 510. The keyboard port 512 is also mounted in the mother board 310.

Figure 11:
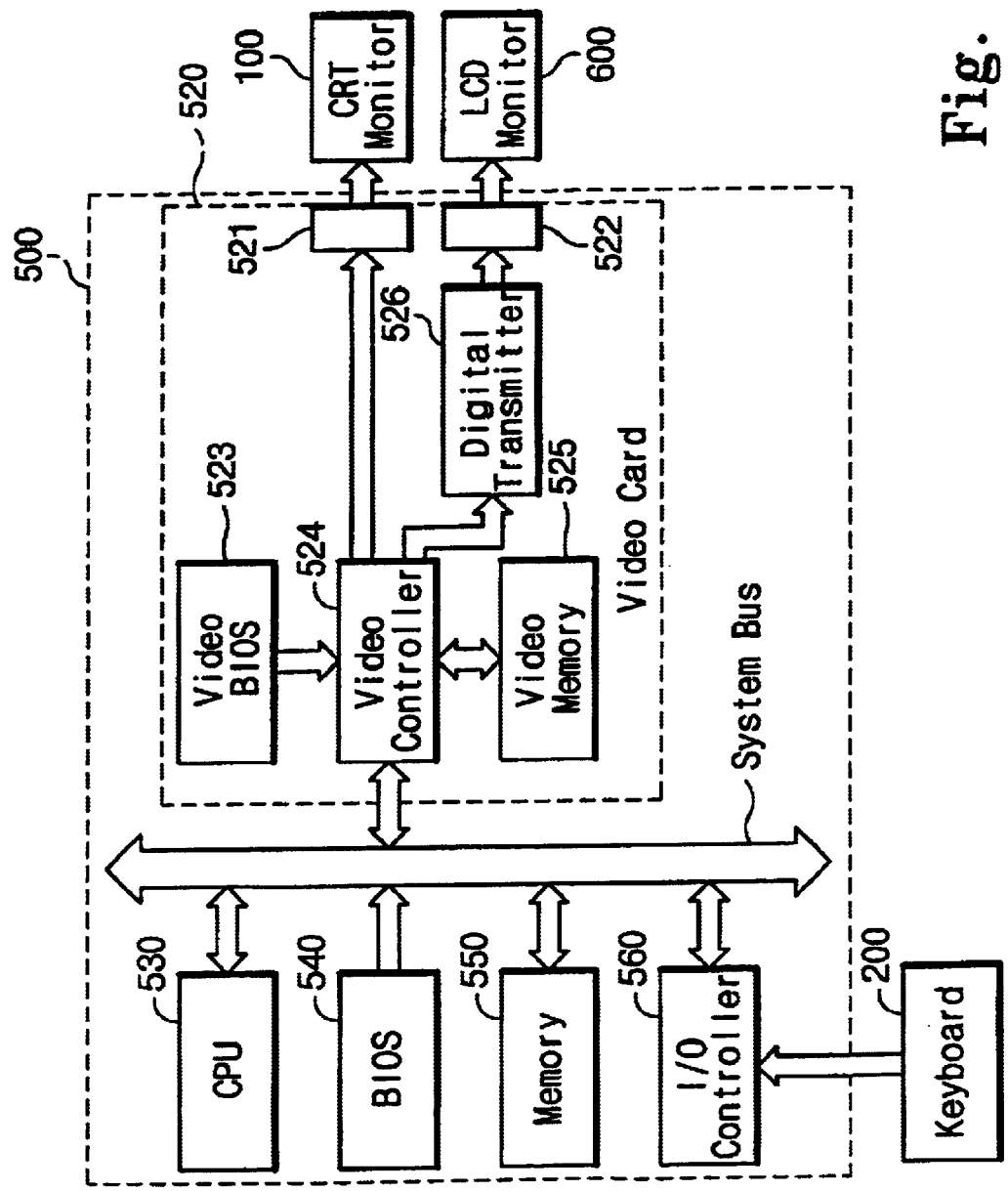
FIG. 11 is a block diagram of a desktop computer system having a VGA card in accordance with one embodiment of the invention.

The computer system adopting such a video card 520 is shown in FIG. 11. The computer system comprises a central processing unit (CPU) 530, a BIOS 540, a main memory 550, an I/O controller 560, and a video card 520. The video card 520 includes a video BIOS 523, a video controller 524, a video memory 525, a digital transmitter 526, a VGA analog connector 521, and a VGA digital connector 522.

The video controller 524 generates analog R, G, B analog video signals corresponding to the stored image in the video memory 525 and transmits the serialized video signals along with horizontal and vertical synchronizing signals to the CRT monitor 100 through the connector 521. The connector 521 uses 15-pin D-Sub female VGA connector. Further, the video controller 524 outputs parallel digital video data and the synchronizing signals to the transmitter 526. The transmitter 526 is made up of a high-speed digital video interconnect device, for example Sil 100 chip, a PanelLink¢â product family of Silicon Images, Inc. This transmitter 526 is used with the pair receiver chip, for example Sil 101, which is usually provided in the digital LCD monitor part. Basically, the transmitter/receiver is provided for sending video data to digital displays, supporting VGA to XGA resolutions for TFT-LCD panels. The Sil 100 transmitter chip 526 incorporates an advanced coding scheme to enable well-known VESA Transition Minimized Differential Signaling (TMDS) for reduced electromagnetic interference (EMI) across copper cables and DC-balancing for data transmission over fiber optics. To maximize data recovery accuracy, the Sil 101 receiver chip oversamples and makes use of a data recovery algorithm to select the most reliable data sampling points.

Figure 12:
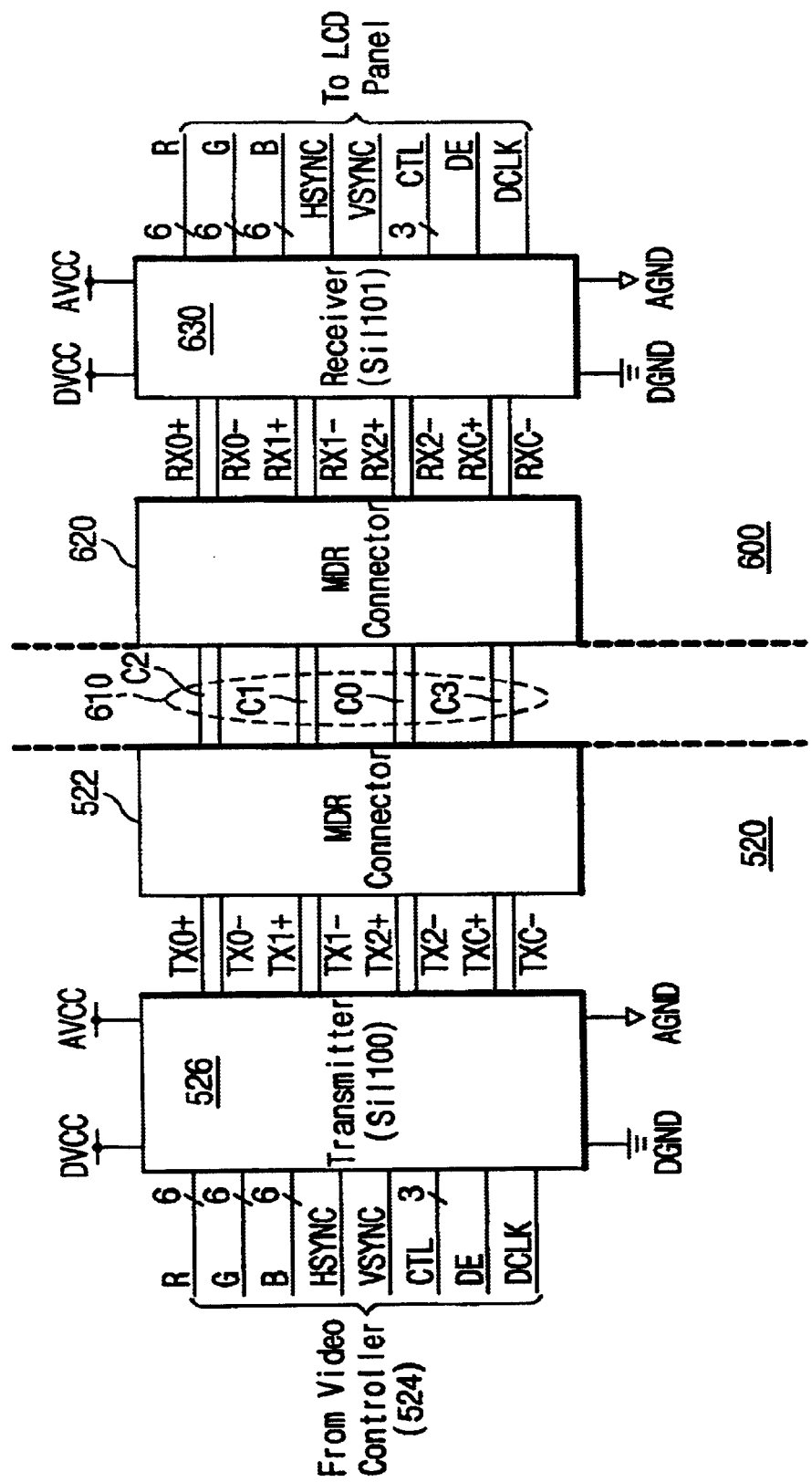
FIG. 12 is a schematic diagram of the digital signal interface between the transmitter of the VGA card and the receiver of the LCD monitor.

As shown in FIG. 12, the transmitter 526 receives parallel digital video data from the host video controller 524. Inputs of the transmitter 526 are 6-bit video data (R, G, B), horizontal and vertical synchronizing signals (HSYNC, VSYNC), 3-bit control signal (CTL), display enable signal (DE), clock signal (DCLK). The transmitter 526 encodes and serializes the parallel input data by the use of an internal PLL circuit. The serialized data is then transmitted to the receiver chip 630 of the LCD monitor 600 over four low voltage differential channels TX0, TX1, TX2 and TXC, the amplitude of which is set by the swing control circuit provided in the transmitter 526. Each channel consists of a pair of lines that is shown in the drawings by addition of + and − thereto. R (red) video data signal is sent over a pair of lines TX0+ and TX0−. G (green) video data signal is sent over a pair of lines TX1+ and TX1−. B (blue) video data signal is sent over a pair of lines TX2+ and TX2−. And the differential clock signal is sent over a pair of lines TXC+ and TXC−, constituting the differential clock channel.

Further, the transmitter 526 is applied by two voltages DVCC and AVCC. The DVCC is an operating voltage for the transmitter 526, for example 3.3 Volts, and the AVCC, nominally 3.3 Volts, is provided for the differential level swing control circuit (not shown) of the transmitter 526. Also, reference numerals AGND denotes the ground of the differential signaling circuit, and DGND denotes the ground of the transmitter chip 526, respectively. Details of the TDMS interconnect scheme and the low voltage differential signaling (LVDS) method is described in the PanelLink¢â Technology Product Family Overview, Sil/DS-0001-B, Rev. 1.0, pp. 11–24, and the relevant parts have been incorporated herein for reference.

The output signal lines of the transmitter 526 are connected to a digital video port 522, called MDR connector, provided in the video card 520. Also, a signal cable 610, preferably made by flex or twisted pair cables, is prepared to connect the MDR connector 522 of the video card 520 to the LCD monitor 600 through the counterpart MDR connectors. Further, signal cable 610 consists of three data channels, C2, C1 and C0 (red, green and blue, respectively) and one clock channel C3.

In the LCD monitor 600, the receiver chip 630 receives the differential signals of the serialized video data and clock from the transmitter 526 via the signal cable 610 and the other MDR connector 620. Inputs of the receiver 630 are corresponding low voltage differential channels RX0, RX1, RX2 and RXC. Also, each channel consist of two signal lines such as RX0+ and RX0− for the received R (red) video data. The receiver 630 includes a termination control circuit for the input differential signals, a decoder/deserializer circuit, and a PLL circuit, all for the recovery of the original parallel data. The receiver chip 630 is also applied by two voltages DVCC and AVCC. The DVCC is an operating voltage for the receiver, for example 3.3 Volts. The AVCC, nominally 3.3 Volts, is provided for the differential signal termination control circuit (not shown) of the receiver 630. These circuits have been omitted for simplicity of the drawings.

The recovered parallel data, that is 6-bit video data (R, G, B), horizontal and vertical synchronizing signals (HSYNC, VSYNC), 3-bit control signal (CTL), display enable signal (DE), and clock signal (DCLK), outputted from the receiver 630 are supplied with the LCD panel of the digital monitor 600.

As mentioned above, the computer system having such video card 520 shown in FIGS. 11 and 12 is capable of using either the CRT monitor 100 or the LCD monitor 600, or simultaneously both two monitors 100 and 600, if a desired video output path has been selected in the BIOS setup program. Further, in any cases the signal cable of the selected monitor should be connected with the corresponding video port. However, if the user selected the LCD monitor 600, for example, the cable of the LCD monitor 600 may not be connected with the computer system, while the CRT monitor cable has been connected therewith. In this case, the video output data of the display adapter 520 will not be sent to the LCD monitor 600, which results in null display of the monitor screen. Further, when the desired cable connection has completed, if the selected monitor is not supplied with the power, the monitor will not operate and also nothing can be seen on the monitor screen. Advantageously, the present invention provides a solution for the monitor selection error and/or the cable connection failure as well as the power failure in the selected monitor.

Figure 13:
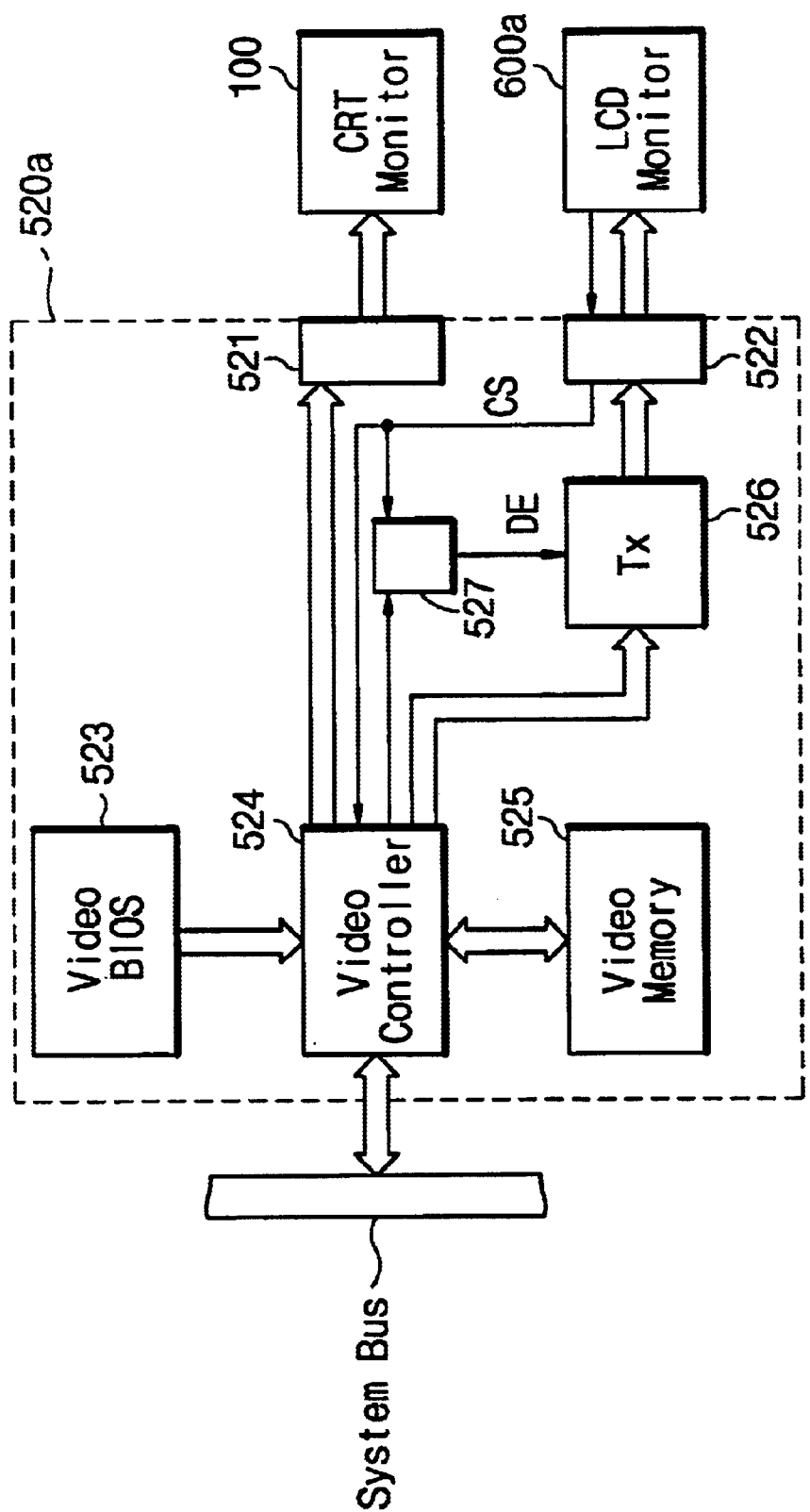
FIG. 13 is a block diagram of the VGA card having a LCD monitor cable sensing circuit in accordance with the invention.
Figure 14:
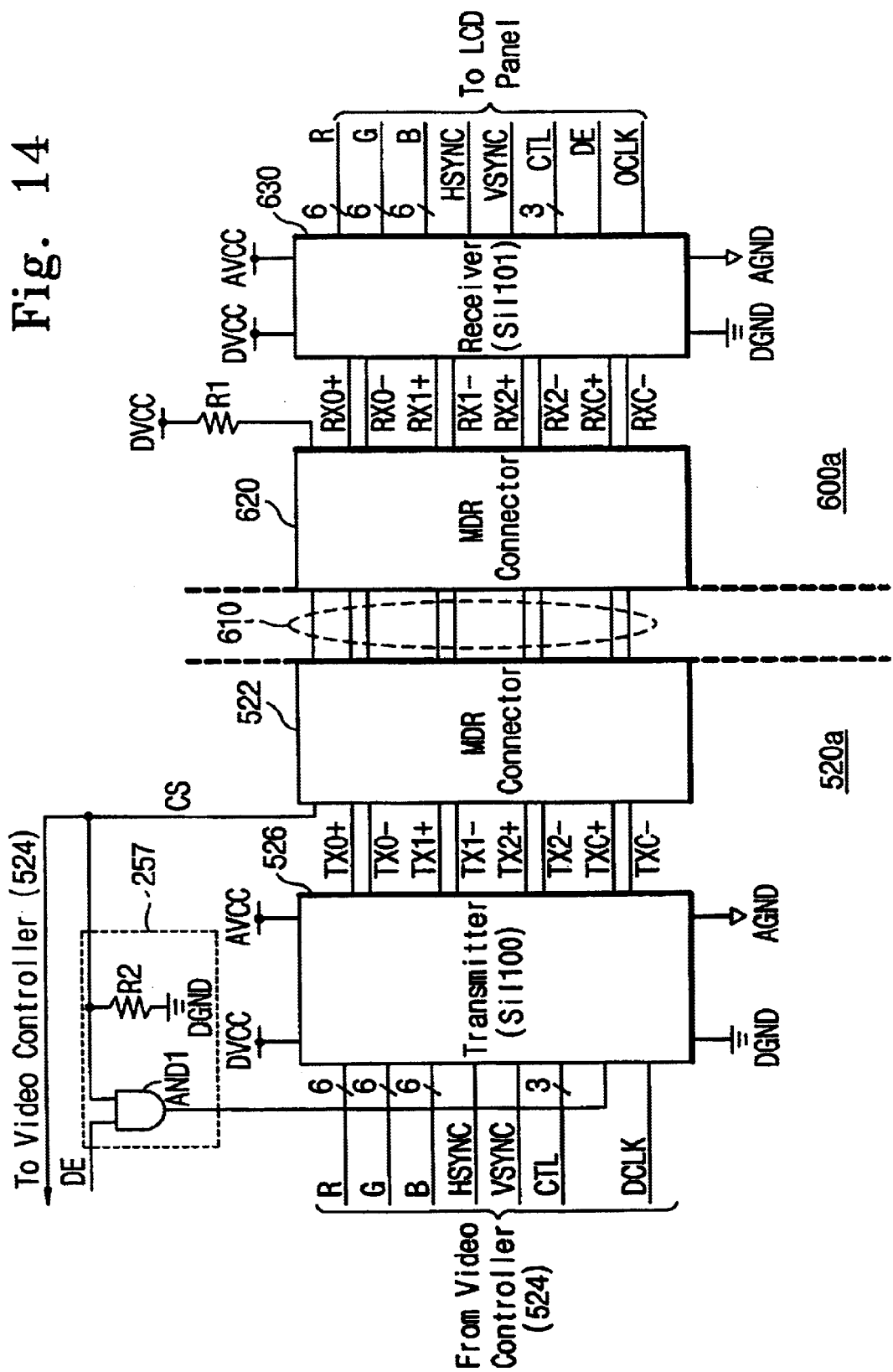
FIG. 14 is a detailed diagram for showing the LCD monitor cable sensing circuit.

FIG. 13 shows a video card 520a having a LCD monitor cable sensing circuit in accordance with the invention. The video card 520a has the same configuration as that of the video card 520 shown in FIG. 11, except a sensing circuit 527 provided for detecting connection state of the LCD monitor cable. If it is found that the LCD monitor cable has connected to the video port 522, the sensing circuit 527 allows the display enable (DE) signal fed from the video controller 524 to enter the transmitter 526. Also, if the LCD monitor cable is not connected with the video port 522, the sensing circuit 527 prevents the display enable (DE) signal from being inputted to the transmitter 526. The detailed circuit diagram of the LCD monitor cable sensing circuit 527 is shown in FIG. 14.

The sensing circuit 527 includes a sense resistor R1 provided at a terminal of the MDR connector 620 of the LCD monitor part. The resistor R1 is applied by the operating voltage DVCC. Preferably, one end of the resistor R1 is connected to the 26th pin (not used) of the MDR connector 620, and the other end thereof connected to the DVCC line of the monitor part 600a. The counterpart MDR connector pin provided at the video card 520a is connected to an input terminal of the video controller 524. Thus, formed is a monitor cable sensing signal (CS) line between the LCD monitor 600a and the video controller 524 of the host computer system, if the monitor cable 610 is completely connected between two MDR connectors 522 and 620.

The sensing circuit 527 further includes a logic circuit 257 consists of an AND gate AND1 and a resistor R2. One input of the gate AND1 is connected with display enable signal line DE outputted from the video controller 524. The other input of the gate AND1 is connected with the 26th pin of the MDR connector 522 or the monitor cable sensing line directed to the controller 524. The pull-down resistor R2 is connected between the sensing signal line CS and the ground DGND. The output of the gate AND1 is connected to the display enable signal input terminal DE of the transmitter 526.

In operation, when the LCD monitor 600a is powered on and the monitor cable 610 is connected with the MDR connector 522, high level signal is produced across the resistor R1 and this high level signal, representing connection of the monitor cable 610, is supplied with one input of the video controller 524 as well as one input of the gate AND1. Then the video controller 524 outputs high level display enable (DE) signal and this high level signal DE is supplied with another input of the gate AND1. Thus, high level signal is produced at the output of the gate AND1 and this signal is supplied with the display enable signal DE input terminal of the transmitter 526. With this, the parallel digital video data received from the host video controller 524 can be serialized and transmitted to the receiver chip 630 of the LCD monitor 600 over the four low voltage differential channels of the cable 610.

However, when the monitor cable 610 is disconnected from the connector 522 or the power failure is occurring in the monitor 600a, the monitor cable sensing signal CS can not be supplied with the video controller 524 and the disabled is the display enable signal DE, which causes operation of the transmitter 526 to be suspended. Therefore, it is possible to prevent unnecessary power consumption in the transmitter 526, if the monitor cable 610 is disconnected or the power failure is occurring in the LCD monitor 600a.

Figure 15:
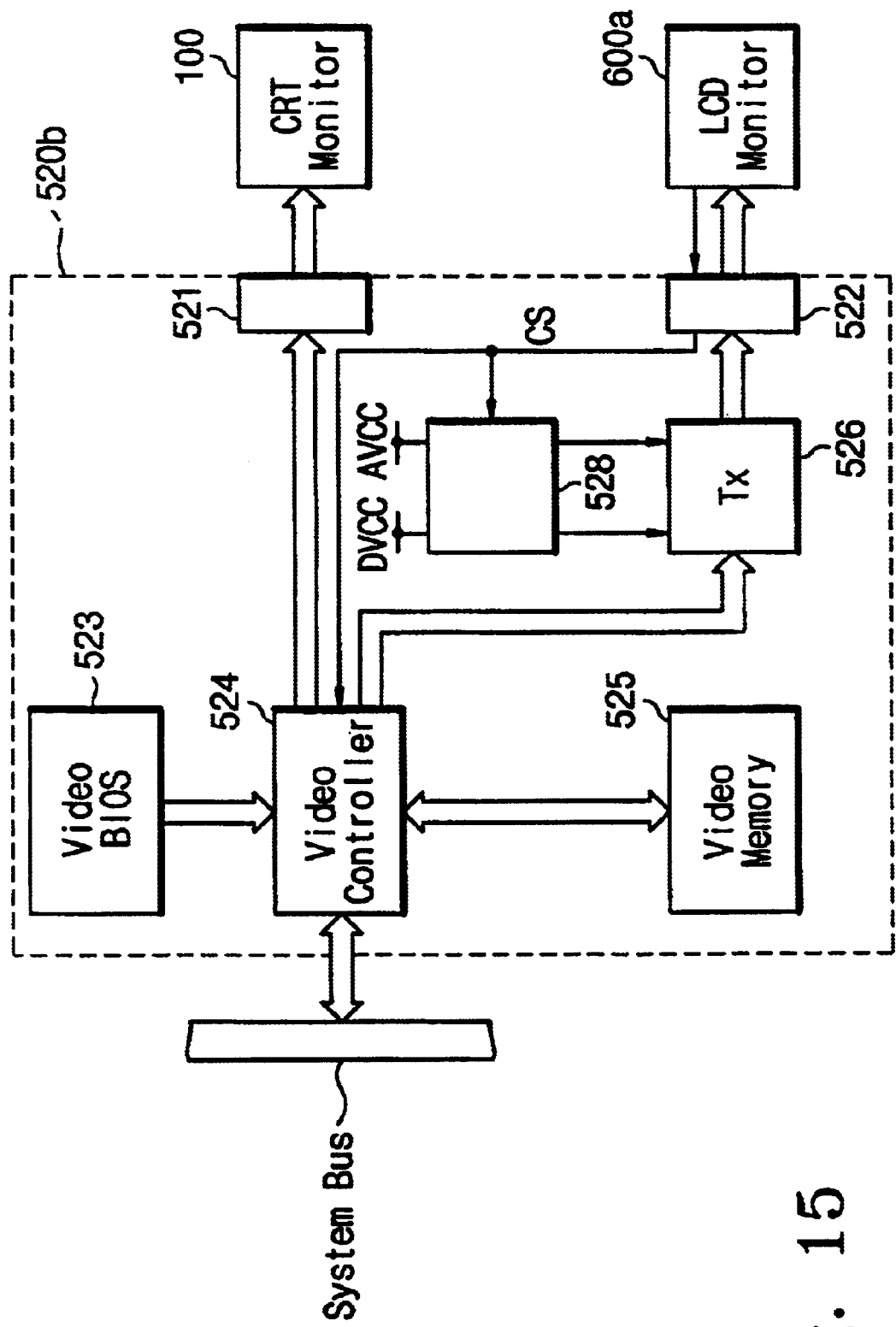
FIG. 15 is a block diagram of the VGA card having a power supply control circuit for the transmitter in accordance with the invention.
Figure 16:
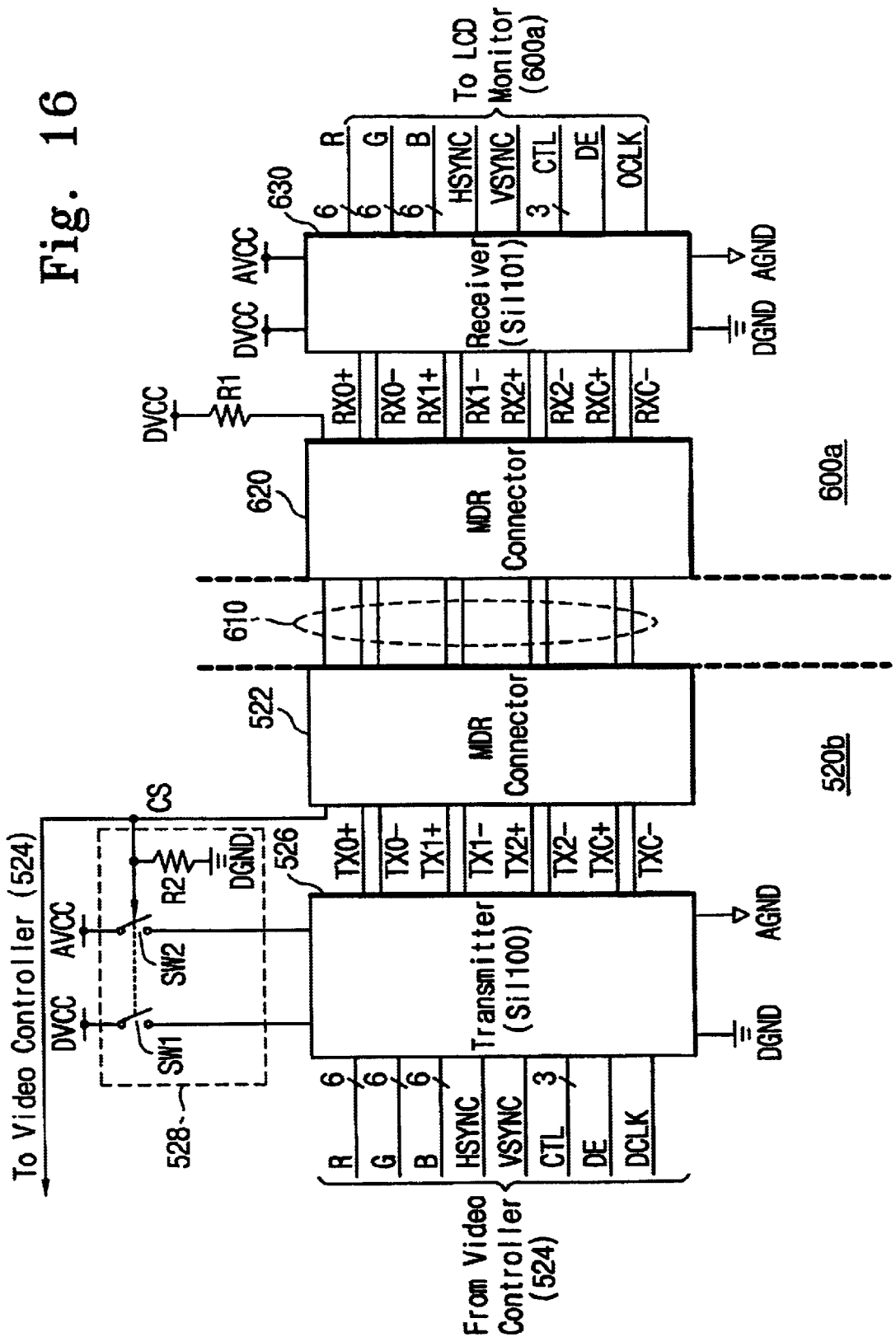
FIG. 16 is a schematic diagram of the power supply control circuit shown in FIG. 15.

Further, another solution for the disconnection of the LCD monitor cable can be seen in FIG. 15. In FIG. 15, there is shown a video card 520b having a power supply control circuit 528 for the transmitter in accordance with the invention. The video card 520b of this invention has the same configuration as that of the video card 520 shown in FIG. 11, except the control circuit 528 that interrupts the supply powers directed to the transmitter 526 when the LCD monitor cable is disconnected from the video port 522. The detailed diagram of the power supply control circuit 528 is shown in FIG. 16.

The power supply control circuit 528 comprises two switches SW1 and SW2 provided across the DVCC and AVCC voltages supply lines, respectively, directed to the transmitter 526. These switches SW1 and SW2 may be of mechanical switches or semiconductor switches that is being activated and turned on in response to the monitor cable sensing signal CS fed from the LCD monitor cable 610 through the MDR connector 522.

When the monitor cable 610 is disconnected from the connector 522 or the power failure is occurring in the monitor 600a, the potential of the cable sensing signal CS can not be applied with the video controller 524 as well as the driving circuit of the switches SW1 and SW2. Thus, the switches SW1 and SW2 are turned off and the supply voltages DVCC and AVCC can not be supplied with the transmitter 526. Therefore, it is possible to prevent power consumption in the transmitter 526 effectively by cut off of the power when the monitor cable 610 is disconnected from the video connector 522.

Figure 17A:
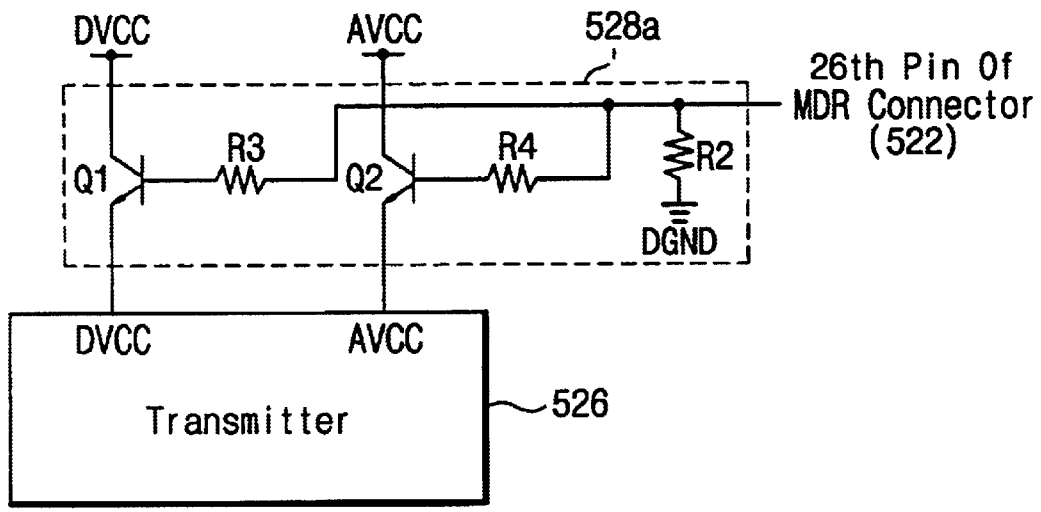
FIGS. 17A–17D are schematic circuit diagrams for showing examples of the power supply control circuit.

Examples of the power supply control circuit 528 are shown in FIGS. 17A–17D. In FIG. 17A, the power supply control circuit 528 may comprise two bipolar switching transistors Q1 and Q2 provided across the DVCC and AVCC voltages supply lines, respectively. The base of transistors Q1, Q2 are commonly connected with the 26th pin of the MDR connector 522 through bias resistors R3 and R4, respectively. These transistors Q1 and Q2 are activated when the potential of the monitor cable sensing signal CS fed from the LCD monitor cable 610 is applied to the base of the transistors Q1, Q2. While, transistors Q1 and Q2 are turned off, when the monitor cable 610 is disconnected from the video connector 522.

Figure 17B:
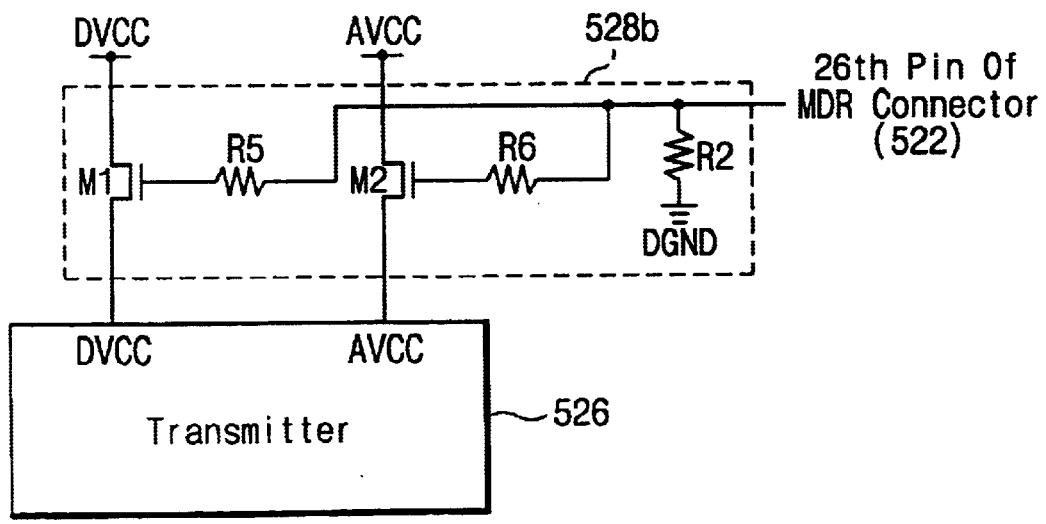

Similarly, FIG. 17B shows that the power supply control circuit 528 is comprised of two MOS switching transistors M1 and M2 provided across the DVCC and AVCC voltages supply lines, respectively. The control gates of transistors Q1, Q2 are commonly connected with the 26th pin of the MDR connector 522 through bias resistors R5 and R6, respectively. These transistors M1 and M2 are turned on when the potential of the monitor cable sensing signal CS fed from the LCD monitor cable 610 is applied to the gate of the transistors M1, M2. While, transistors M1 and M2 are turned off when the monitor cable 610 is disconnected from the video connector 522.

Figure 17C:
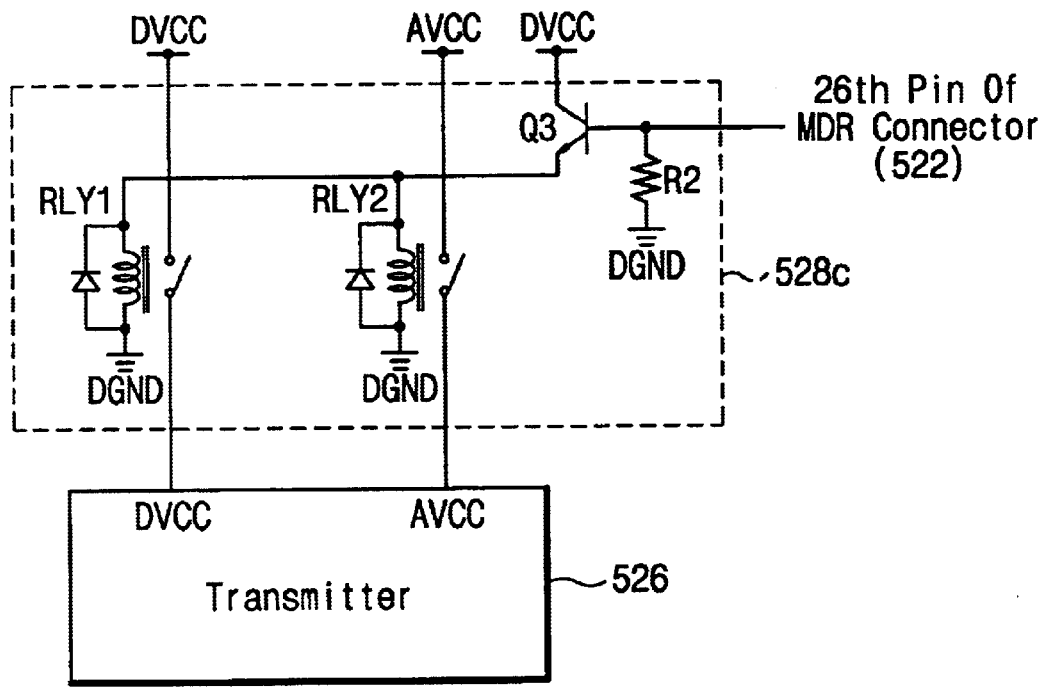

Further, as shown in FIG. 17C, the power supply control circuit 528 may comprise two relay switches RLY1 and RLY2 provided across the DVCC and AVCC voltages supply lines, respectively. Each relay switch includes the corresponding actuator coil that is coupled to a driving transistor Q3 provided across the DVCC voltage supply line. The base of the driving transistor Q3 is connected with the 26th pin of the MDR connector 522. The driving transistor Q3 is turned on when the potential of the monitor cable sensing signal CS is applied and thus each relay coil is activated by the supply voltage DVCC to switch on the relay switches RLY1, RLY2. While, the transistor Q3 and the relay coils are deactivated when the monitor cable 610 is disconnected from the video connector 522.

Figure 17D:
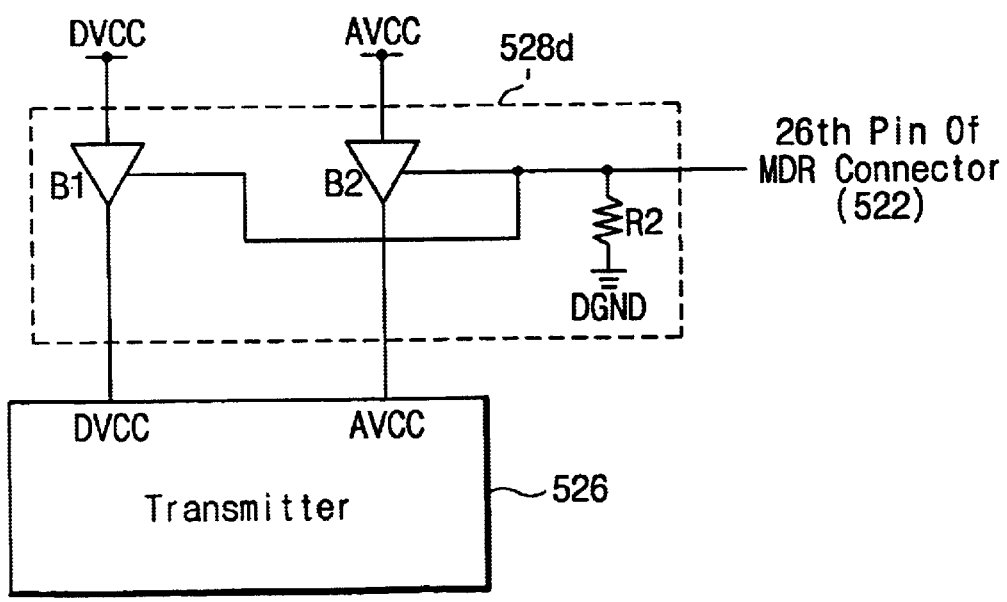

Furthermore, the power supply control circuit 528 may comprise two buffers B1 and B2 provided across the DVCC and AVCC voltages supply lines, respectively, as shown in FIG. 17D. Each buffer responds to logic high level of the monitor cable sensing signal CS and supplies the DVCC and AVCC voltages with the transmitter 526. Also, Each buffer interrupts the supply voltages directed to the transmitter 526 when the LCD monitor cable 610 is disconnected from the video port 522.

With the above described circuit arrangements, the power supply control circuit 528 of the video card 520 prevents unnecessary power consumption in the digital transmitter 526, if the monitor cable 610 is disconnected or the power failure is occurring in the LCD monitor 600. Further, as the 26th pin of the MDR connector 522, that is the monitor cable sensing signal line is connected with the video controller 524, the video controller 524 is capable of determining whether the LCD monitor cable 610 has connected with the connector 522. Thus, the video controller 524 may allow the video signal to be sent to one of the LCD monitor 600 and CRT monitor 100, any one that is connected with the video card 520, regardless of the video start-up direction or video output path set in the computer system.

Referring to FIG. 18, there is shown an exterior view of a notebook computer 700 having an analog/digital display adapter, in which extra CRT monitor 100 and LCD monitor 600 can be used with the notebook computer 700 in accordance with another embodiment of this invention.

Figure 19:
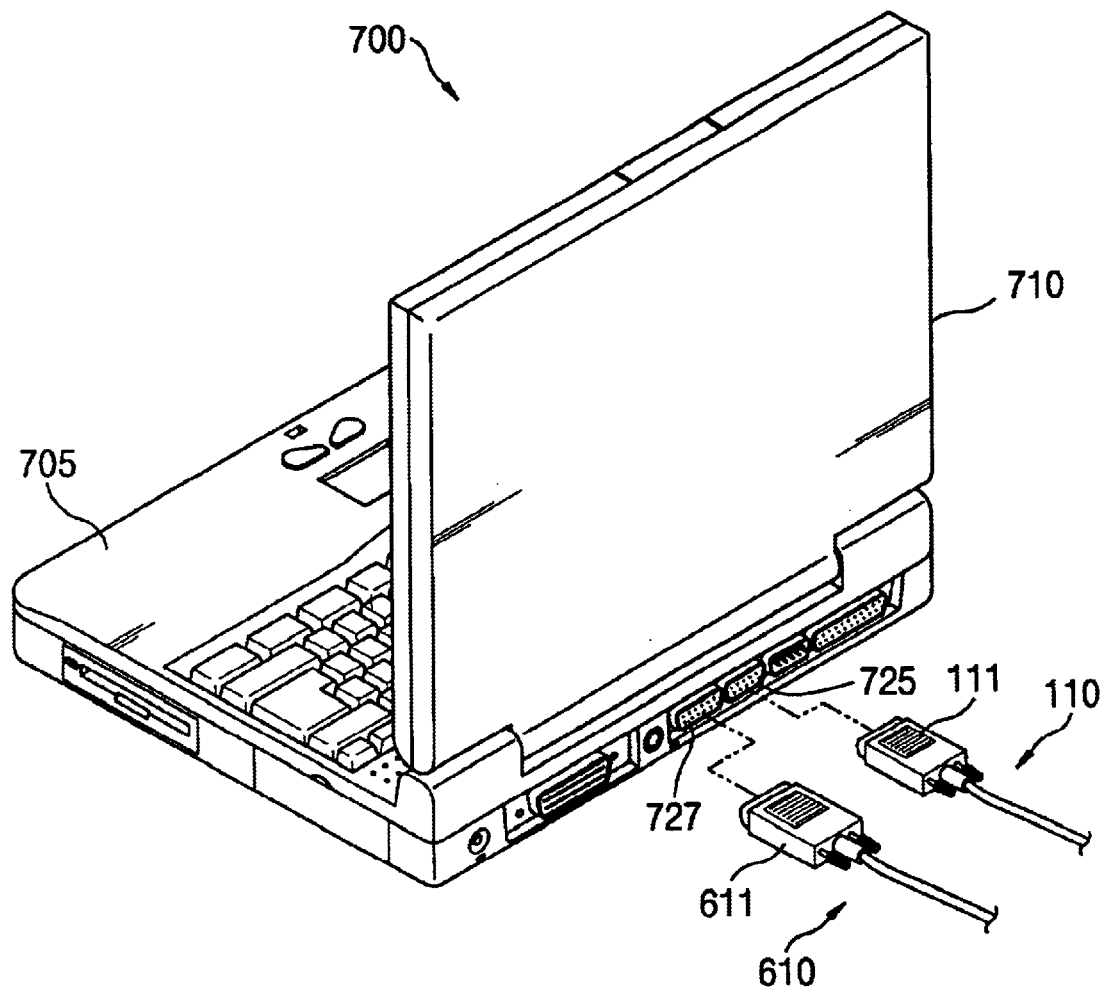
FIG. 19 is a rear view of the notebook computer of FIG. 18, for showing connection of the CRT monitor cable and LCD monitor cable with two video ports thereof.

FIG. 19 illustrates rear side of the notebook computer 700, where two external video port 725 and 727, preferably 15-pin D-Sub female connector and MDR female connector are provided in line with serial/parallel ports. The CRT monitor cable 110 has an analog 15-pin D-Sub male connector 111, and the LCD monitor cable 610 has an MDR male connector 611. These connectors 111 and 611 can be coupled with the external video port 725 and 727, respectively, when required. The notebook computer 700 also includes a LCD panel 710 as a main display hingedly attached to the main body 705 of the notebook computer.

Figure 20:
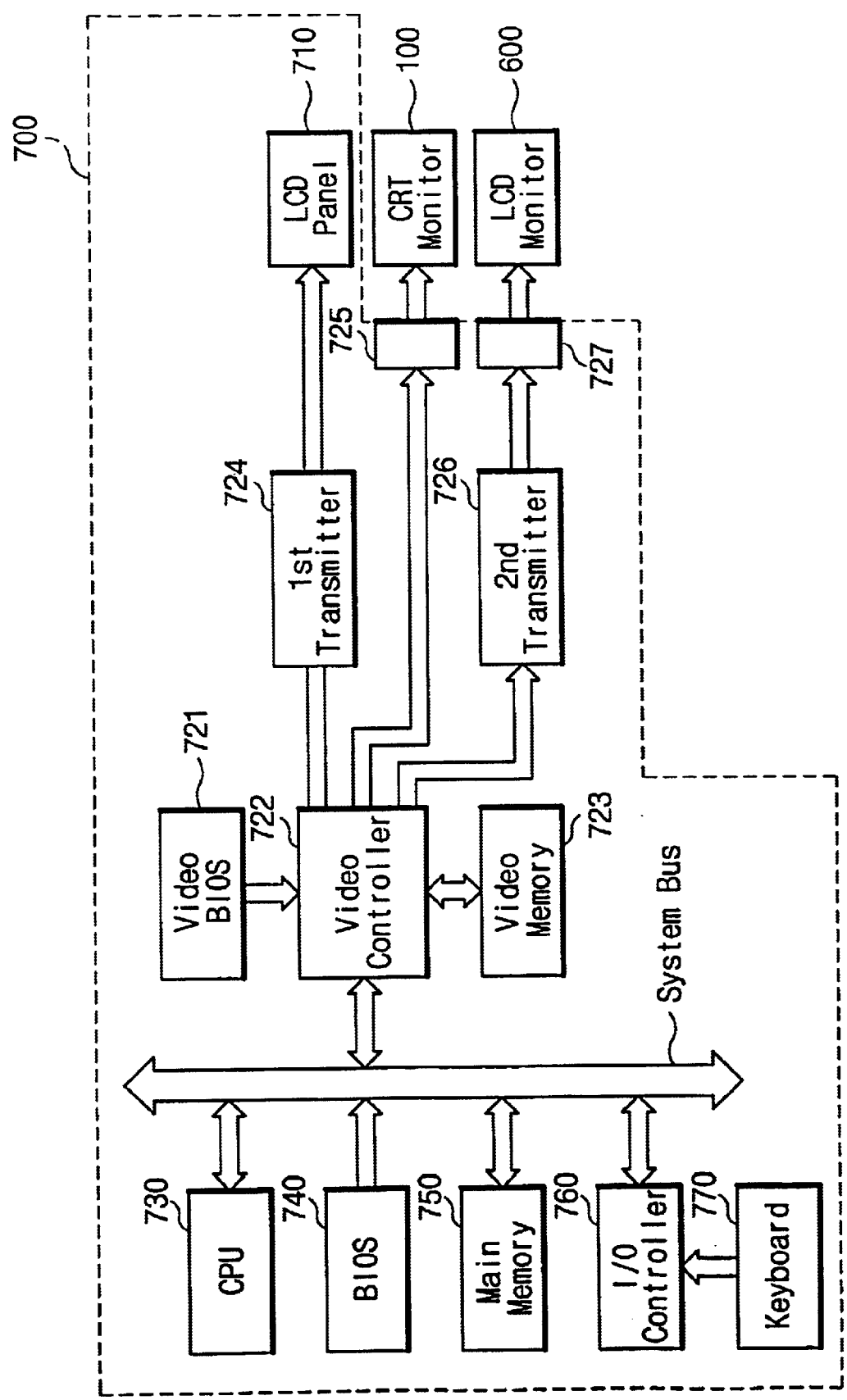
FIG. 20 is a block diagram of the notebook computer system having a VGA card with an external CRT port and LCD port in accordance with another embodiment of the invention.

FIG. 20 shows a configuration of the above-noted notebook computer system. The notebook computer system comprises a central processing unit (CPU) 730, a BIOS 740, a main memory 750, an I/O controller 760, a video BIOS 721, a video controller 722, a video memory 723, a first transmitter 724, and a second transmitter 726.

The first transmitter 724 is a high speed digital video interconnect device as described above with reference to FIG. 7, for sending video memory data to the LCD panel 710 under control of the video controller 722. The LCD panel 710 also includes the counterpart digital receiver. The second transmitter 726 has the same configuration as that of the digital transmitter 526 shown in FIGS. 11 and 13. The second transmitter 726 transmits the digital video data to the extra LCD monitor 600 under control of the video controller 722. The extra LCD monitor 600 also includes the counterpart digital receiver. The video controller 722 also has analog R, G, B video signal output function that transmits serialized video signals along with horizontal and vertical synchronizing signals to the extra CRT monitor 100.

The analog video signals are sent to the CRT monitor 100 through the external video port 725 and CRT monitor cable 110. Also, the digital video data outputted from the second transmitter 726 are sent to the extra LCD monitor 600 through another external video port 727 and LCD monitor cable 611.

The above notebook computer system basically outputs video signals from the video controller 722 to the LCD panel 710. Further, the computer system has a video output path control function that selectively determines the output path to the extra CRT monitor 100 or LCD monitor 600 in response to a video setup information stored in the system BIOS or special key input of the keyboard 770. All the LCD panel 710, CRT monitor 100 and LCD monitor 600 can be operated simultaneously by appropriate function key input operation.

Further, the above notebook computer system may comprise a LCD monitor cable sensing circuit for detecting connection state of the LCD monitor cable. This monitor cable sensing circuit may be the same or like the configuration as that of the sensing circuit 527 provided in a video card 520a of the first embodiment of this invention. If the LCD monitor cable 611 is not connected with the video port 727, the sensing circuit detects the disconnection state and prevents the display enable signal (DE) supplied by video controller 722 from being inputted to the second transmitter 726.

In addition, the above notebook computer system may comprise a power supply control circuit for interrupting supply powers directed to the second transmitter 726 when the LCD monitor cable 611 is disconnected from the external video port 727. This power supply control circuit can be configured like the control circuit 528 of the video card 520b mentioned in the first embodiment of the present invention. If the monitor cable 611 is disconnected from the connector 727 or the power failure is occurring in the extra LCD monitor 600, the switches provided across the power supply lines of transmitter 726 are turned off and the supply voltages DVCC and AVCC can not be supplied with the transmitter 726.

Thus, it is possible to prevent unnecessary power consumption in the second transmitter 726 when the extra LCD monitor is not in normal connection state. In this state, the notebook computer system may change its video output path to the LCD panel or the extra CRT monitor. The video controller 722 allows the video signal to be sent to one of the LCD panel or the CRT monitor, any one that is connected with the video card 520, regardless of the video start-up direction or the video output path set in the computer system.

As apparent from the foregoing description, the present invention provides for a maximum user convenience in connecting any of the digital display and analog display with one computer system since display adapter according to this invention is capable of detecting monitor cable connection state. Further, this invention contributes to power saving of the computer system since the display adapter of the invention is capable of reducing power consumed therein when the monitor cable is disconnected from the computer system.

What is claimed is:

1. A display adapter for use in a computer system, comprising:
    a video controller supplying serial analog video signals and parallel digital video signals;
    a first connector coupling with an analog monitor cable connector;
    a second connector coupling with a digital monitor cable connector;
    a digital transmitter sending parallel digital video signals to an external digital monitor through the second connector; and
    a monitor power detector detecting the presence of power in an external analog monitor connected to said analog monitor cable connector and in said external digital monitor, whereby a display enable signal is generated in the video controller and is sent to enable corresponding video signals to be sent to corresponding external monitors when a signal from a corresponding external monitor senses the presence of power applied to said external monitor and to disable corresponding video signals from being sent to corresponding external monitors when a signal from the corresponding external monitor indicates an absence of power applied to said corresponding external monitor.

2. The display adapter of claim 1, further comprising monitor cable sensors sensing whether said analog monitor cable connected to said first connector as well as sensing whether said digital monitor cable connected to said second connector, whereby the display enable signal is generated in the video controller to enable corresponding video signals to be sent to the corresponding external monitor when a signal from the corresponding external monitor indicates connection of a corresponding monitor cable to the corresponding connector, and to disable corresponding video signals from being sent to a corresponding external monitor when the signal from the corresponding external monitor indicates an absence of a connection of a corresponding monitor cable to the corresponding connector.

3. The display adapter of claim 2, each external monitor comprises a means for generating a signal to indicate both the connection of the monitor cable and to indicate the presence of power applied to the external monitor.

4. The display adapter of claim 3, further comprising a power supply control circuit switching on/off supply voltages of the digital transmitter based on a signal from the external digital monitor that indicates whether said digital monitor cable is connected to second connector.

5. The display adapter of claim 3, further comprising a power supply control circuit switching on/off supply voltages in the digital transmitter by said power supply control circuit based on said signal that indicates the presence/absence of power applied to said external digital monitor.

6. A portable computer system, comprising:
    a LCD panel hingedly attached to a main body of the portable computer;
    a video controller for providing digital video data to the LCD panel;
    a first external video port connecting a digital cable to an external digital monitor; and
    a digital transmitter sending parallel digital video data to said external digital monitor, said digital monitor comprises a means for generating a cable sensing signal to be sent to said first external video port over the digital cable, thereby informing the video controller of the digital cable connection state of said first external port, said system further comprising a monitor power sensor detecting a presence of power applied to the external digital monitor, whereby a display enable signal is generated in the video controller and is sent to the transmitter to enable the digital video signals to be sent to the external digital monitor when the presence of power applied to the external digital monitor is detected.

7. The portable computer system of claim 6, further comprising a power supply control circuit switching on/off of supply voltages of the transmitter based on said cable sensing signal fed from the external digital monitor such that the supply voltages are supplied to the transmitter only if said digital cable is connected to said first external video port.

8. The portable computer system of 7, further comprising a power supply control circuit switching on/off of supply voltages of the transmitter based on a signal fed from the external digital monitor causing power to be applied to the transmitter only power is applied to said external digital monitor.

9. A portable computer system, comprising:
    a LCD panel hingedly attached to a main body of the portable computer;
    a video controller for providing digital video data to the LCD panel;
    a first external video port connecting a digital cable to an external digital monitor; and
    a digital transmitter sending parallel digital video data to said external digital monitor, the video controller further generates analog video signals to be sent to a second external video port and then to an external analog monitor, said external analog monitor being connected to said second external video port by an analog cable, said system further comprising a monitor power sensor detecting a presence of power applied to the external digital monitor, whereby a display enable signal is generated in the video controller and is sent to the transmitter to enable the digital video signals to be sent to the external digital monitor when the presence of power applied to the external digital monitor is detected.

10. The portable computer system of claim 9, further comprising a monitor cable sensor detecting a presence/absence of a connection of said monitor cables to said first and said second external video ports, respectively, whereby a display enable signals are generated in the video controller and sent to corresponding transmitters when a connection between a corresponding monitor cable and a corresponding external video port is detected.

11. A method of displaying data on a computer monitor, comprising the steps of:
    supplying data corresponding to a required image to a video controller;
    supplying serial analog video signals and parallel digital video signals in accordance with the required image;
    providing first and second connectors coupling with analog and digital monitor cable connectors, respectively;
    providing a digital transmitter and sending the parallel digital video signals to an external digital monitor through the second connector; and displaying the required image on the external digital monitor, said method further comprising the steps of:

detecting the presence of power in each of said external monitors;

enabling corresponding video signals to be sent to the corresponding external monitors only when a sensing signal from a corresponding external monitor indicates the presence of power applied to the corresponding external monitor; and disabling corresponding video signals from being sent to a corresponding external monitor when a sensing signal from the corresponding external monitor indicates an absence of power applied to said corresponding external monitor.

12. A method according to claim 11, further comprising the steps of:

detecting connection of said analog monitor cable with said first connector and detecting connection of said digital monitor cable with said second connector;

enabling corresponding video signals to be sent to an external analog monitor over said analog monitor cable and/or said external digital monitor based on said detection step; and disabling corresponding video signals from being sent to a corresponding external monitor when a corresponding monitor cable is disconnected from a corresponding connector.

13. A method of claim 12, further comprising the step of switching on/off supply voltages of the digital transmitter based on the cable sensing signal fed from the external digital monitor.

14. A method of claim 13, further comprising the step of switching on/off supply voltages of the digital transmitter in response to a sensing signal fed from the external digital monitor indicating the presence/absence of power in the external digital monitor.

* * * * *